US011859264B2

(12) United States Patent
Togashi et al.

(10) Patent No.: US 11,859,264 B2
(45) Date of Patent: Jan. 2, 2024

(54) ALLOY POWDER AND METHOD FOR PRODUCING SAME

(71) Applicant: SUMITOMO METAL MINING CO., LTD., Tokyo (JP)

(72) Inventors: Ryo Togashi, Niihama (JP); Yu Yamashita, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 356 days.

(21) Appl. No.: 17/258,763

(22) PCT Filed: Jul. 11, 2019

(86) PCT No.: PCT/JP2019/027575
§ 371 (c)(1),
(2) Date: Jan. 8, 2021

(87) PCT Pub. No.: WO2020/013293
PCT Pub. Date: Jan. 16, 2020

(65) Prior Publication Data
US 2021/0126300 A1    Apr. 29, 2021

(30) Foreign Application Priority Data

Jul. 12, 2018 (JP) ................. 2018-132646

(51) Int. Cl.
B22F 9/08 (2006.01)
C22B 7/00 (2006.01)
(Continued)

(52) U.S. Cl.
CPC ............... *C22B 7/001* (2013.01); *B22F 1/00* (2013.01); *B22F 1/05* (2022.01); *B22F 9/082* (2013.01);
(Continued)

(58) Field of Classification Search
None
See application file for complete search history.

(56) References Cited

U.S. PATENT DOCUMENTS

2012/0240729 A1    9/2012 Verscheure et al.
2014/0069234 A1*   3/2014 Takahashi ................ C22B 1/02
                                                     75/414

(Continued)

FOREIGN PATENT DOCUMENTS

CN    103526035 A  *  1/2014
CN    105063349 A    11/2015
(Continued)

OTHER PUBLICATIONS

English translation of CN 103526035 (originally published Jan. 22, 2014), obtained from PE2E search.*

(Continued)

*Primary Examiner* — George Wyszomierski
(74) *Attorney, Agent, or Firm* — Locke Lord LLP; James E. Armstrong, IV; Nicholas J. DiCeglie, Jr.

(57) ABSTRACT

Provided are: an alloy powder that can be obtained from a waste lithium ion battery, wherein the alloy powder can be dissolved in an acid solution and enables recovery of metals contained in the alloy powder; and a method for producing the alloy powder. This alloy powder contains Cu and at least one of Ni and Co as constituent components, wherein a portion having a higher concentration of the at least one of Ni and Co than the average concentration in the entire alloy powder is distributed on at least the surface, and the phosphorus grade is less than 0.1% by mass. The method for producing the alloy powder includes a powdering step for powdering a molten alloy using a gas atomization method,
(Continued)

the molten alloy containing Cu and at least one of Ni and Co as constituent components and having a phosphorus grade of less than 0.1% by mass.

2 Claims, 3 Drawing Sheets

(51) Int. Cl.
    *C22B 7/04*     (2006.01)
    *C22B 15/00*     (2006.01)
    *C22C 9/06*     (2006.01)
    *H01M 10/54*     (2006.01)
    *B22F 1/05*     (2022.01)
    *B22F 1/00*     (2022.01)

(52) U.S. Cl.
CPC ............ *C22B 7/04* (2013.01); *C22B 15/0054* (2013.01); *C22B 15/0093* (2013.01); *C22C 9/06* (2013.01); *H01M 10/54* (2013.01); *B22F 2009/0848* (2013.01)

(56) References Cited

U.S. PATENT DOCUMENTS

| | | |
|---|---|---|
| 2014/0102256 A1 | 4/2014 | Mori et al. |
| 2014/0174256 A1 | 6/2014 | Takahashi et al. |
| 2014/0318313 A1 | 10/2014 | Takahashi et al. |
| 2017/0005374 A1 | 1/2017 | Brouwer et al. |
| 2020/0216929 A1* | 7/2020 | Higaki ................ C22B 15/0093 |

FOREIGN PATENT DOCUMENTS

| | | |
|---|---|---|
| JP | H03-078906 A | 4/1991 |
| JP | H08-264860 A | 10/1996 |
| JP | 2000-256766 A | 9/2000 |
| JP | 2012-251220 A | 12/2012 |
| JP | 2013-091826 A | 5/2013 |
| JP | 5434934 B2 | 3/2014 |
| JP | 5818798 B2 | 11/2015 |
| JP | 2017-509786 A | 4/2017 |
| WO | 2013/080266 A1 | 6/2013 |
| WO | 2015/096945 A1 | 7/2015 |

OTHER PUBLICATIONS

International Search Report dated Oct. 1, 2019, issued for PCT/JP2019/027575.

* cited by examiner

ALLOY POWDER AND METHOD FOR PRODUCING SAME

TECHNICAL FIELD

The present invention relates to an alloy powder and a method for producing it.

BACKGROUND ART

In recent years, lithium ion batteries have been widely used as secondary batteries which are lightweight, and which produce a high output. As the lithium ion battery, a lithium ion battery is known where a negative electrode material in which a negative electrode active material such as graphite is fixedly adhered to a negative electrode current collector formed of copper foil, a positive electrode material in which a positive electrode active material such as lithium nickelate or lithium cobalt oxide is fixedly adhered to a positive electrode current collector formed of aluminum foil, a separator which is formed with a polypropylene porous resin film or the like, an electrolytic solution which includes an electrolyte such as lithium hexafluorophosphate ($LiPF_6$), and the like are sealed into an exterior can formed of a metal such as aluminum or iron.

As one of the main applications of the lithium ion battery, hybrid and electric automobiles are present, and along with the life cycles of the automobiles, a large number of lithium ion batteries mounted thereon are expected to be discarded in the future. A large number of proposals have been made in which the above-described used batteries and defective products that were generated during the production of the batteries (hereinafter referred to as "waste lithium ion batteries") are recycled as resources, and as a method of recycling the waste lithium ion batteries, a dry smelting process is proposed in which all the waste batteries are melted in a high-temperature furnace.

The waste lithium ion battery includes copper, nickel, and cobalt, which are valuable metals; and when they are recycled as the resources of the lithium ion battery, it is desirable to recover these valuable metals. When among these valuable metals, only nickel and copper are recovered, the dry smelting process is performed as with a general dry copper-smelting process so as to obtain a copper-nickel alloy, and the copper-nickel alloy is electrorefined as an anode plate, with the result that the electrorefined copper and the nickel remaining in an electrolytic solution can be recovered.

However, even when cobalt is attempted to be recovered from the waste lithium ion battery by this method, as is clear from the fact that the standard generated free energy of the oxide of cobalt is low, in the dry copper-smelting process, cobalt is distributed to the side of slag, with the result that it is impossible to recover cobalt.

Even when the valuable metals are attempted to be recovered from the waste lithium ion battery with a wet copper-smelting process, phosphorus derived from lithium hexafluoride or the like which is included as an electrolyte in the waste lithium ion battery is included as an impurity in electrowinned copper, and thus an additional step for removing phosphorus is needed, with the result that the cost of the smelting process is increased.

Since in the waste lithium ion battery, not only copper, nickel, cobalt, and the like, which are valuable metals; but also impurity components such as phosphorus, carbon, aluminum, manganese, iron and, fluorine are included, when the valuable metals are recovered from the waste lithium ion battery, these impurity components need to be removed as much as possible. The remaining carbon among these impurity components prevents the separation of the metals and slag. Since carbon contributes as a reducing agent, the proper oxidation removal of other substances may be prevented. Since in particular, among the impurity components described above, phosphorus is relatively easily reduced, when the degree of reduction thereof is adjusted to be excessively high in order to increase the rate of recovery of copper, nickel, and cobalt, phosphorus remains in the metals without being removed by oxidation. On the other hand, when the degree of reduction is adjusted to be excessively low, even the valuable metals are oxidized, with the result that the rate of recovery is lowered.

Hence, in order to stably perform the recovery of copper, nickel, and cobalt and the removal of phosphorus, the amount of carbon needs to be stably controlled such that the proper degree of oxidation-reduction is provided.

For example, Patent Document 1 proposes, as a dry method of recovering cobalt from a waste lithium ion battery, a process which casts the waste lithium ion battery into a melting furnace and which performs oxidation by oxygen.

Patent Document 2 proposes a process which performs pre-oxidation before melting in order to stabilize oxidation treatment. In this way, the removal of carbon into a gas phase is stabilized, and thus it is possible to stably recover valuable metals.

Patent Document 1: Japanese Patent No. 5818798
Patent Document 2: Japanese Patent No. 5434934

DISCLOSURE OF THE INVENTION

Problems to be Solved by the Invention

However, in the process of Patent Document 1, while cobalt can be recovered at a high rate of recovery, the removal of phosphorus is not described, with the result that it is not clear whether the recovery of valuable metals such as cobalt and the removal of phosphorus can be stably performed.

In the process of Patent Document 2, it is difficult to adjust the degree of oxidation such that phosphorus can be selectively distributed to slag and removed, and when valuable metals are attempted to be recovered at a high rate of recovery, a step of removing phosphorus is needed as a post-step.

In order to cope with this problem, a method can be considered which includes an oxidation roasting step of roasting the waste lithium ion battery so as to perform oxidation treatment and a reduction melting step of melting the waste lithium ion battery subjected to the oxidation treatment under the presence of a reducing agent so as to obtain a molten material, and which separates slag and an alloy from the molten material so as to perform recovery. In this method, the alloy which is mainly formed of copper, nickel, and cobalt without containing phosphorus is recovered, the recovered alloy is used as an anode for electrowinning from a sulfuric acid solution, and thus the alloy can be refined. The alloy is refined by electrowinning, and thus these metals included in the waste lithium ion battery can be recycled.

However, since in the method of obtaining the alloy by electrowinning, a large amount of electrical energy is needed for electrolysis, it is desirable to reduce the use of electrical energy when the alloy is refined. Here, as a means for reducing the use of electrical energy, a method can be considered which refines the alloy by leaching treatment using an acid solution so as to recover the valuable metals. However, since the copper-nickel-cobalt alloy in the state in which it was recovered is not easily dissolved in an acid solution of even a strong acid, the valuable metals cannot be effectively refined and recovered by the acid leaching treatment.

The present invention is proposed in view of the situation as described above, and an object thereof is to provide, for example, an alloy powder which can be obtained from a waste lithium ion battery, which can be easily dissolved in an acid solution, and in which valuable metals included in the alloy powder can be efficiently recovered, and a method for producing such an alloy powder.

Means for Solving the Problems

The present inventors have performed a thorough study in order to solve the problem described above. Consequently, the present inventors have found that an alloy powder is used which includes, on its surface, a concentrated portion where the concentrations of nickel and cobalt are increased and in which a phosphorus grade is less than 0.1% by mass, and that thus the alloy powder can be easily dissolved in an acid solution such that large amounts of copper, nickel, and cobalt can be rapidly recovered by acid treatment, and thereby have completed the present invention.

(1) A first invention of the present invention is an alloy powder which includes at least one of Cu, Ni, and Co as a constituent component, in which a concentrated portion where a concentration of at least one of Ni and Co is higher than the average concentration in the entire alloy powder is distributed on at least a surface and in which a phosphorus grade is less than 0.1% by mass.

(2) A second invention of the present invention is an alloy powder in which in the first invention, the alloy powder includes a plurality of crystallites, and in which the average diameter of the crystallites is equal to or less than 15 μm.

(3) A third invention of the present invention is an alloy powder in which in the first or second invention, the average particle diameter of the alloy powder is equal to or greater than 20 μm and equal to or less than 300 μm.

(3) A fourth invention of the present invention is an alloy powder in which in any one of the first to third inventions, the alloy powder is a copper-nickel-cobalt alloy powder.

(5) A fifth invention of the present invention is a method for producing an alloy powder, and the method includes a powdering step of powdering, with a gas atomization method, a molten alloy which includes at least one of Cu, Ni, and Co as a constituent component and in which a phosphorus grade is less than 0.1% by mass.

(6) A sixth invention of the present invention is a method for producing an alloy powder in which in the fifth invention, the method includes: a melting step of melting a waste lithium ion battery so as to obtain a molten material; a slag separation step of separating slag including phosphorus from the molten material so as to recover an alloy material that contains Cu and at least one of Ni and Co; and a powdering step of powdering the molten alloy formed of the alloy material.

(7) A seventh invention of the present invention is a method for producing an alloy powder in which in the sixth invention, the method further includes a pre-heating step of roasting, before the melting step, the waste lithium ion battery at such a temperature that the waste lithium ion battery is not melted.

(8) An eighth invention of the present invention is a method for producing an alloy powder in which in any one of the fifth to seventh inventions, a molten material of a copper-nickel-cobalt alloy is used as the molten alloy in the powdering step.

Effects of the Invention

According to the present invention, it is possible to provide, for example, an alloy powder which can be obtained from a waste lithium ion battery, which can be easily dissolved in an acid solution, and in which valuable metals included in the alloy powder can be efficiently recovered, and a method for producing such an alloy powder.

PREFERRED MODE FOR CARRYING OUT THE INVENTION

Figure 1:
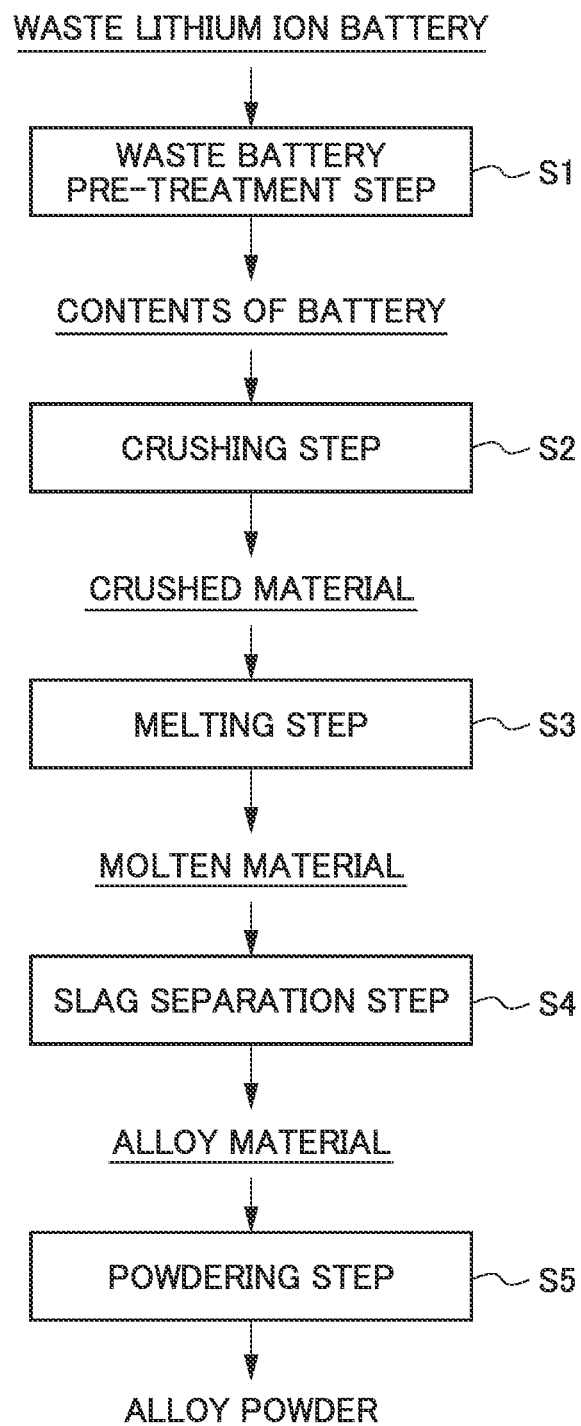
FIG. 1 is a process chart which shows an example of a method for producing an alloy powder.

A specific embodiment (hereinafter referred to as the "present embodiment") of the present invention will be described in detail below. The present invention is not limited to the following embodiment, and various modifications are possible without departing from the spirit of the present invention.

<<1. Alloy Powder>>

An alloy powder according to the present embodiment contains at least one of Cu, Ni, and Co as a constituent component, a concentrated portion in which the concentration of at least one of Ni and Co is higher than the average concentration in the entire alloy powder is distributed on at least the surface thereof; and a phosphorus grade is less than 0.1% by mass. The alloy powder as described above can be easily dissolved in an acid solution, and thus large amounts of copper, nickel, and cobalt of the alloy powder can be rapidly recovered by acid treatment. The alloy powder as described above can be obtained from, for example, a waste lithium ion battery.

(Constituent Components of Alloy Powder)

The alloy powder contains at least one of Cu, Ni, and Co as a constituent component, and as a specific example thereof, a copper-nickel-cobalt alloy powder is mentioned. The specific constituent components of the alloy powder are determined by the raw materials for obtaining the alloy powder; for example, by the composition of a waste lithium ion battery or the like.

In the alloy powder according to the present embodiment, the concentrated portion in which the concentration of at least one of Ni and Co is higher than the average concentration in the entire alloy powder is distributed on at least the surface. The concentrated portion as described above is included on the surface, and thus the rates at which the nickel, cobalt, and copper included in the concentrated portion are leached into the acid solution are increased, and the acid enters air gaps after the leaching, with the result that the contact area of the alloy powder and the acid solution is increased. In this way, the alloy powder is easily dissolved in the acid solution, and thus the valuable metals can be more efficiently leached from the alloy powder.

Here, the concentrated portion refers to a portion (for example, a Co concentrated portion, a Ni concentrated portion) in which the concentration of at least one of Ni and Co is higher than the average concentration in the entire alloy powder, and the concentration of at least one of Ni and Co in a portion in which the concentration of the concentrated portion is the highest is more preferably higher than the average concentration in the entire alloy powder by 3% by mass or more and is further preferably higher than the average concentration by 5% by mass or more. Since a portion in which the concentration of Ni is equal to or greater than 20% by mass and a portion in which the concentration of Co is equal to or greater than 20% by mass that are distributed in the alloy powder are easily dissolved in the acid solution, they can be regarded as the Co concentrated portion and the Ni concentrated portion, respectively. In a region in which neither Ni nor Co is concentrated, a portion is present in which the content of Cu is equal to or greater than 95% by mass, and the rate at which such a portion is leached into the acid solution is relatively low.

The average concentrations of Ni and Co in the entire alloy powder can be determined with, for example, a known method such as ICP emission spectrography, and can also be determined with, for example, an analytical method of fluorescent X-rays or the like on the outer surface of the alloy or the internal flat surface exposed by cutting or griding the alloy powder. For the analysis of fluorescent X-rays, an energy dispersive X-ray spectrometer (EDS) or the like can be used. The area of particles occupying the field of view (number of pixels) is determined from the image of the measurement result of the energy dispersive X-ray spectrometer, and a ratio is determined by dividing the area of a portion in which the atom thereof is determined to be present by the area described above (number of pixels), with the result that the ratio may be assumed to be an approximate value of the average concentration in the entire atom.

The concentrations of Ni and Co in the concentrated portion of the alloy powder can also be measured with the energy dispersive X-ray spectrometer (EDS) or the like, and by the same method as the average concentration, an approximate value can be determined from the image of the measurement result.

In the alloy powder according to the present embodiment, the phosphorus grade is less than 0.1% by mass. The phosphorus grade in the alloy powder is reduced, and thus when the valuable metals of the alloy are recovered by an acid leaching reaction, the mixing of phosphorus into the recovered valuable metals can be reduced. Hence, on the recovered valuable metals, refining treatment such as dephosphorization treatment does not need to be further performed, and thus it is possible to increase the efficiency of recovery of the metals from the alloy powder. The content of phosphorus in the alloy powder is preferably less than 0.1% by mass and more preferably less than 0.01% by mass, and it is most preferable that no phosphorus be contained. A sulfur grade in the alloy powder is preferably low for the same reason as the phosphorus grade, and the sulfur grade is preferably less than, for example, 0.1% by mass.

Here, when the alloy powder is a copper-nickel-cobalt alloy powder, as the average composition of the alloy powder, for example, a composition is mentioned in which the content of Cu falls within a range equal to or greater than 50% by mass and equal to or less than 97% by mass, in which the content of Ni falls within a range equal to or greater than 3% by mass and equal to or less than 30% by mass, and in which the content of Co falls within a range equal to or greater than 3% by mass and equal to or less than 30% by mass. In particular, as the alloy powder containing both Ni and Co, an alloy powder is mentioned in which the total content of Ni and Co falls within a range equal to or greater than 3% by mass and equal to or less than 50% by mass.

In addition to Cu, Ni, and Co, an impurity may be included in the alloy powder. In particular, when an impurity in the alloy powder is obtained by a method which will be described later, the impurity is often an element whose affinity for oxygen is lower than that for carbon, and examples thereof include iron (Fe) and manganese (Mn). The total content of impurities in the alloy powder is preferably low, and may be preferably equal to or less than 10% by mass, more preferably equal to or less than 5% by mass, and further preferably equal to or less than 3% by mass.

(Average Diameter of Crystallites)

The alloy powder according to the present embodiment includes a plurality of crystallites, and the average diameter of the crystallites is preferably equal to or less than 15 μm. In this way, a large number of grain boundaries which are generated between adjacent crystallites are present in the alloy powder, and the acid solution enters the grain boundaries so as to be supplied to the individual crystallites, with the result that the acid solution is leached into the valuable metals. The acid enters the air gaps after the leaching, and thus the acid solution is easily leached into the entire alloy powder. Consequently, the valuable metals can be more efficiently leached from the alloy powder.

The average diameter of the crystallites of the alloy powder (the average value of the diameters of the crystallites) can be preferably equal to or less than 15 μm and more preferably equal to or less than 3 μm with reference to the cross-sectional area. In this way, the valuable metals can be rapidly leached.

Here, the average diameter of the crystallites included in the alloy powder can be measured with a scanning electron microscope (SEM). More specifically, a squared grid is overlaid on an SEM photograph of a cross section of the alloy powder, the number of intersections between vertical and horizontal grid lines and the grain boundaries within a predetermined range are counted, and the total length of the grid within the range (which does not include the lengths of portions of the grid crossing the grain boundaries) is divided by the number of intersections, with the result that the average length of line segments crossing the cross sections of the individual crystallites shown in the SEM photograph is determined. Here, when it is assumed that the cross-sectional shape of the crystallite is a circle in which the center of gravity of the cross section of the crystallite is the center thereof and whose cross-sectional area is equal to that of the crystallite, the average length of this line segment can be approximated to the length of a chord crossing the circle whose cross-sectional area is equal to that of the crystallite P. Then, the average length of this line segment is multiplied by $(4/\pi)$ so as to be able to be converted into the diameter of the crystallite in the SEM photograph, and this diameter is divided by the magnification of the SEM, with the result that the average diameter of the crystallites included in the alloy powder is determined. Here, in order to evaluate the efficiency of the leaching of the valuable metals, it is preferable to determine the average diameter of crystallites whose diameter is equal to or greater than 0.1 μm.

Figure 3:
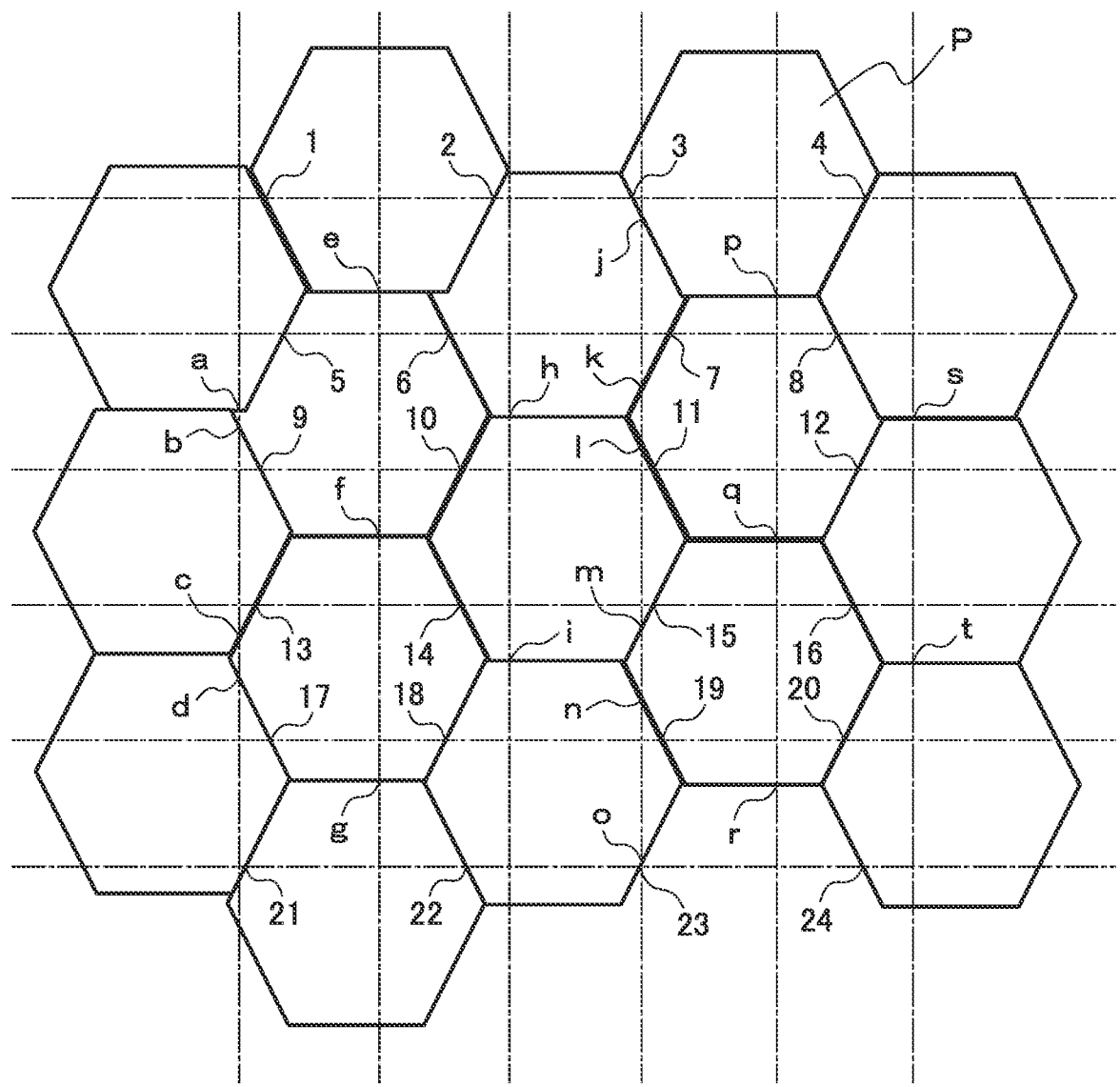
FIG. 3 is a schematic view illustrating a method of measuring the average diameter of crystallites.

For example, when as shown in FIG. 3, a squared grid which is shown by imaginary lines and in which vertical and horizontal intervals are 1 cm is overlaid on an SEM photograph of the alloy powder in which hexagonal crystallites P are arranged in a honeycomb shape and in which grain boundaries between adjacent crystallites P are so small as to be able to be ignored (the image of the grain boundaries is so thin as to be able to be ignored), within a range of 5×5 squares where vertical and horizontal grid lines cross each other, the number of intersections between grid lines in the horizontal direction and the grain boundaries is counted to be 24 (marks 1 to 24 in FIG. 3) and the number of intersections between grid lines in the vertical direction and the grain boundaries is counted to be 20 (marks a to t in FIG. 3), with the result that the total length of the grid within this range is 60 cm. Here, the average length of line segments crossing the cross sections of the individual crystallites P shown in the SEM photograph is determined to be 60/(20+24)=1.4 cm, and the diameter of the crystallite P in the SEM photograph is determined to be 1.4×(4/π)=1.78 cm. This diameter is divided by the magnification of the SEM, and thus the average diameter of the crystallites P can be determined.

(Average Particle Diameter/Maximum Particle Diameter of Alloy Powder)

In the alloy powder according to the present embodiment, the average particle diameter preferably falls within a range equal to or greater than 20 μm and equal to or less than 300 μm. The average particle diameter of the alloy powder is equal to or less than 300 μm and more preferably equal to or less than 100 μm, and thus the specific surface area of the alloy powder is increased, with the result that the contact area of the alloy powder and the acid solution is increased. Hence, when copper, nickel, and cobalt are recovered from the alloy powder, the alloy powder is more easily dissolved in the acid solution, and thus these valuable metals can be recovered more efficiently.

On the other hand, as the average particle diameter of the alloy powder is decreased, the efficiency with which the alloy powder is obtained is lowered, with the result that the cost of treatment for obtaining the alloy powder is increased. This easily causes the occurrence of dust and ignition. Hence, the average particle diameter of the alloy powder is preferably equal to or greater than 20 μm and more preferably equal to or greater than 25 μm.

Here, the average particle diameter of the alloy powder is a value which is determined based on a volume average diameter by a laser diffraction/scattering method.

In the alloy powder according to the present embodiment, the maximum particle diameter is preferably equal to or less than 400 μm. The maximum particle diameter of the alloy powder is decreased, and thus when the acid treatment is performed on the alloy powder, the residue of unreacted alloy powder can be reduced.

<<2. Method for Producing Alloy Powder>>

The alloy powder according to the present embodiment can be obtained by a production method that includes a powdering step of powdering, with a gas atomization method, a molten alloy which contains at least one of Cu, Ni, and Co as a constituent component and in which a phosphorus grade is less than 0.1% by mass, and can be obtained by using, for example, a waste lithium ion battery as a raw material. Here, the raw materials of the alloy powder are not limited to the waste lithium ion battery, and may be, for example, an electronic material such as a used circuit board and a defective product generated during the production thereof.

The "waste lithium ion battery" in the present specification is a concept which includes a used lithium ion battery, a defective product generated in the production process of a positive electrode material or the like of the lithium ion battery, a residue within the production process and a waste material such as waste generated within the production process of the lithium ion battery, and in the recovery of valuable metals from the waste lithium ion battery, materials in which the waste lithium ion battery is mixed are often treated. In the waste lithium ion battery, for example, not only copper, nickel, and cobalt, which are valuable metals; but also impurities of phosphorus and the like are included.

Figure 2:
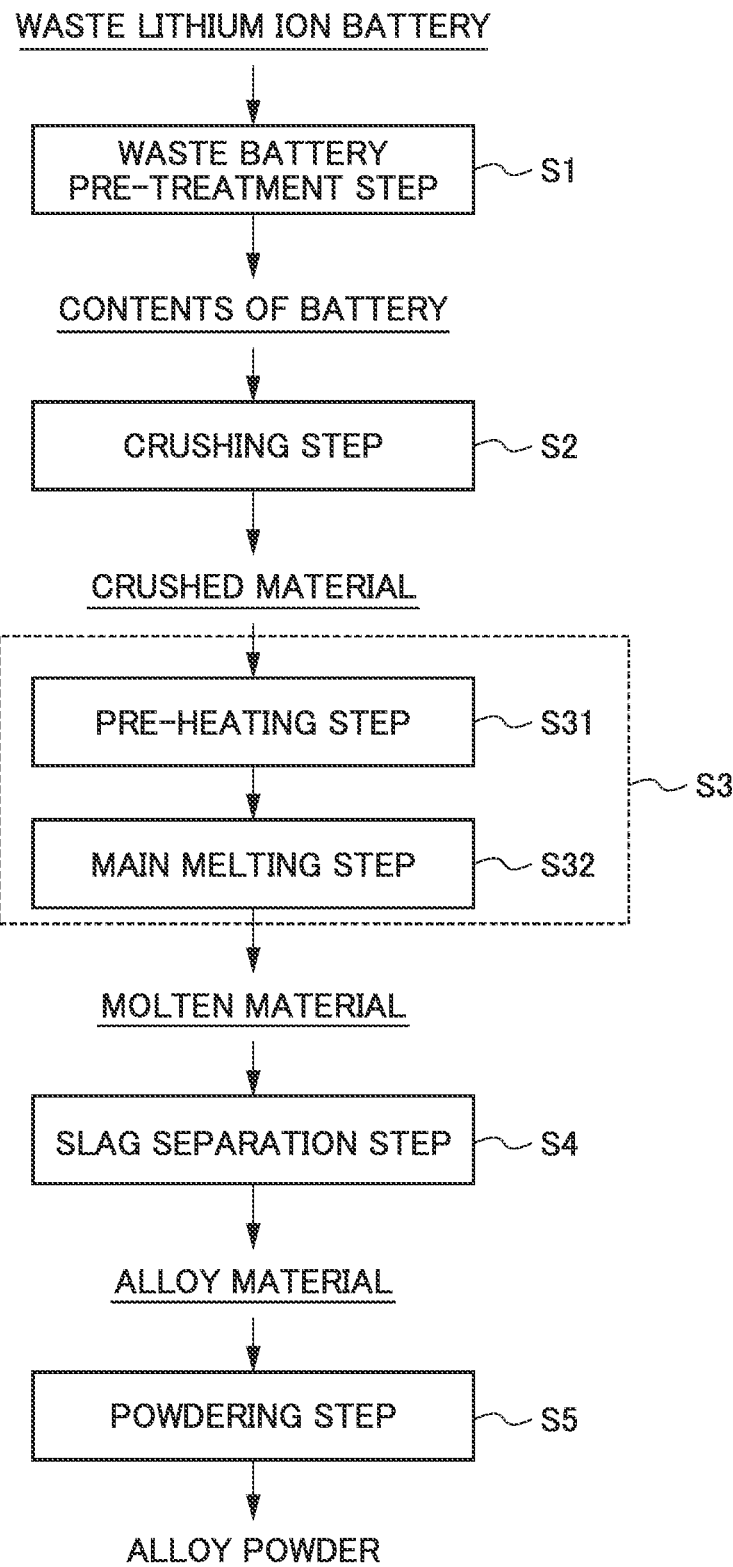
FIG. 2 is a process chart which shows another example of the method for producing an alloy powder.

FIG. 1 is a process chart which shows an example of the flow of a method for producing the alloy powder from the waste lithium ion battery. As shown in FIG. 1, the method for producing the alloy powder includes: a waste battery pre-treatment step S1 of removing the electrolytic solution and the exterior can of the waste lithium ion battery; a crushing step S2 of crushing the contents of the battery so as to form a crushed material; a melting step S3 of melting the crushed material into an alloy so as to obtain a molten material formed of an alloy material and slag; a slag separation step S4 of separating slag including phosphorus from the molten material so as to recover the alloy material; and a powdering step S5 of powdering the alloy material. Among them, as shown in FIG. 2, the melting step S3 may include a pre-heating step S31 of pre-heating the crushed material and a main melting step S32 of melting the crushed material after being pre-heated into the alloy so as to obtain the molten material.

The individual steps in the method for producing the alloy powder according to the present embodiment will be specifically described below.

[Waste Battery Pre-Treatment Step]

The waste battery pre-treatment step S1 is performed, for example, in order to prevent the explosion of the waste lithium ion battery or to detoxify the waste lithium ion battery and to remove the exterior can. Specifically, since a waste lithium ion battery such as the used lithium ion battery is a sealed system and has electrolytic solution and the like therewithin, when the waste lithium ion battery is subjected to crushing treatment without being processed, the waste lithium ion battery is dangerous because it may explode. Hence, it is necessary to perform discharge treatment and removal treatment of the electrolytic solution in some way. As described above, in the waste battery pre-treatment step S1, the electrolytic solution and the exterior can are removed, and thus it is possible to enhance safety and the productivity of the alloy powder.

Although a specific method in the waste battery pre-treatment step S1 is not particularly limited, for example, a hole is physically opened in the battery with a needle-shaped cutting edge, and thus the electrolytic solution therewithin can be made to flow out so as to be removed. The waste lithium ion battery may be detoxified by heating the waste lithium ion battery without being processed and thereby burning the electrolytic solution.

Since the exterior can is often formed of a metal such as aluminum or iron, the waste battery pre-treatment step S1 is performed, and thus the metallic exterior can as described above can be easily recovered without being processed. For example, when aluminum or iron included in the exterior can are recovered, the removed exterior can is crushed and can be thereafter sieved with a sieve shaker. In the case of aluminum, even when the exterior can is lightly crushed, it is easily formed into powder, with the result that aluminum can be efficiently recovered. By sorting using a magnetic force, it is also possible to recover iron included in the exterior can.

[Crushing Step]

In the crushing step S2, the contents of the battery obtained through the waste battery pre-treatment step S1 are crushed, and thus the crushed material is obtained. The treatment in the crushing step S2 is performed in order to enhance the efficiency of reactions in the subsequent steps, and the efficiency of the reactions is enhanced, with the result that the rate of recovery of the valuable metals can be increased.

Although a specific crushing method in the crushing step S2 is not particularly limited, the contents of the battery can be crushed with a conventionally known crusher such as a cutter mixer.

[Pre-Heating Step]

The melting step S3 is performed on the crushed material of the waste lithium ion battery obtained through the crushing step S2. Although the melting step S3 includes at least the main melting step S32, before the main melting step S32, the pre-heating step S31 of roasting the crushed material of the waste lithium ion battery at such a temperature that the crushed material is not melted may be performed as necessary. Here, the pre-heating step S31 is performed, and thus the impurities included in the contents of the battery can be removed by being volatilized through heating or by being thermally decomposed.

In the pre-heating step S31, heating is preferably performed at a temperature (pre-heating temperature) equal to or greater than 650° C. The pre-heating temperature is equal to or greater than 650° C., and thus the efficiency of removal of the impurities included in the battery can be further enhanced, and thus it is possible to reduce the treatment time. On the other hand, the upper limit of the pre-heating temperature is set to such a temperature range that the crushed material of the waste lithium ion battery is not melted, and more specifically, the upper limit is preferably set to equal to or less than 900° C. In this way, the crushed material of the waste lithium ion battery is prevented from being melted in the pre-heating step S31, and the thermal energy cost can be reduced, with the result that the efficiency of the treatment can be enhanced.

The pre-heating step S31 is preferably performed under the presence of an oxidant. In this way, it is possible to reach such a degree of oxidation that among the impurities included in the contents of the battery, carbon can be removed by oxidation and aluminum can be oxidized. In particular, carbon is removed by oxidation, and thus molten fine particles of the metals generated locally in the subsequent main melting step S32 can be aggregated without the physical interference of carbon, with the result that the alloy material obtained as the molten material can be easily recovered as the integral alloy. In general, major elements of the waste lithium ion battery are easily oxidized due to differences in their affinity with oxygen in the order of aluminum>lithium>carbon>manganese>phosphorus>iron>cobalt>nickel>copper.

Although the oxidant used in the pre-heating step S31 is not particularly limited, in terms of ease of handling, a gas including oxygen such as air, pure oxygen, or an oxygen-enriched gas is preferably used. The amount of oxidant introduced here can be about 1.2 times a chemical equivalent which is necessary for the oxidation of each of the substances serving as targets for the oxidation treatment.

[Main Melting Step]

In the main melting step S32, the crushed material of the waste lithium ion battery after being pre-heated is melted as necessary, and thus the molten material formed of the alloy material and the slag is obtained. In this way, unnecessary phosphorus is included in the slag, and aluminum is also included as an oxide in the slag. On the other hand, the oxides of copper, nickel, and cobalt, which are relatively unlikely to form oxides, are reduced; they are melted together with these unoxidized metals so as to form an alloy phase and thus the alloy material, which contains copper, nickel, and cobalt, which are valuable metals; and in which the phosphorus grade is reduced to 0.1% by mass or less, can be obtained from the molten material as the integral alloy.

The main melting step S32 may be performed under the presence of an oxidant and a reducing agent in order to appropriately adjust the degree of oxidation-reduction when the waste lithium ion battery is melted.

Here, as the oxidant, a known oxidant can be used. As a method of bringing the oxidant into contact with the crushed material of the waste lithium ion battery, a solid oxidant may be added to the waste lithium ion battery or a gaseous oxidant may be introduced into a furnace.

Although as the reducing agent, a known reducing agent can be used, a reducing agent including a carbon atom is preferable. The reducing agent including a carbon atom is added to the waste lithium ion battery, and thus the oxides of copper, nickel, and cobalt, which are included in the waste lithium ion battery and which are targets to be recovered, can be easily reduced. As an example of the reducing agent including a carbon atom, graphite is mentioned, in which 2 moles of a metal oxide such as a copper oxide or a nickel oxide can be reduced by 1 mole of carbon. A hydrocarbon which can reduce 2 to 4 moles of a metal oxide per mole of carbon, carbon monoxide which can reduce 1 mole of a metal oxide per mole of carbon or the like can be used as a supply source of carbon. Hence, the main melting step S32 is performed under the presence of carbon serving as the reducing agent, and thus the metal oxides are efficiently reduced, with the result that the alloy material including copper, nickel, and cobalt can be obtained more effectively. It is also advantageous that in the reduction using carbon, the reacted carbon is easily removed as carbon dioxide gas.

A heating temperature (battery melting temperature) in the melting treatment of the main melting step S32 is not particularly limited as long as the heating temperature falls within a range of temperatures in which the crushed material of the waste lithium ion battery is melted; however, the heating temperature preferably falls within a range equal to or greater than 1300° C. and more preferably falls within a range equal to or greater than 1350° C. The melting treatment is performed at a temperature equal to or greater than 1300° C., and thus the alloy material is formed from a state where fluidity is sufficiently enhanced by melting, with the result that it is possible to enhance the efficiency of separation of the alloy material and the impurities in the slag separation step S4 which will be described later.

On the other hand, when the battery melting temperature exceeds 1500° C., thermal energy is consumed wastefully, and thus the wear of refractories such as a melting pot and a furnace wall becomes significant, with the result that the productivity may be lowered. Hence, the battery melting temperature is preferably equal to or less than 1500° C.

In the main melting step S32, a flux may be used. The main melting treatment is performed with the flux, and thus the oxides of aluminum, phosphorus, and the like are dissolved in the flux so as to be incorporated into the slag, with the result that they can be removed.

Although in the melting treatment of the waste lithium ion battery, dust, exhaust gas, and the like may be generated, they can be detoxified by performing conventionally known exhaust gas treatment.

[Slag Separation Step]

In the slag separation step S4, the slag including phosphorus is separated from the molten material obtained in the main melting step S32, and thus the alloy material including the valuable metals is recovered. Here, since the alloy material and the slag included in the molten material are different in specific gravity, the difference in specific gravity is utilized, and thus the alloy material in which phosphorus is reduced and the slag including phosphorus can be individually recovered. It is possible to recover the alloy material which contains at least one of Cu, Ni, and Co as a constituent component, and in particular, it is also possible to recover the alloy material in which the phosphorus grade is less than 0.1% by mass.

[Powdering Step]

The powdering step S5 is a step of powdering the molten alloy obtained by melting the alloy material, and thus it is possible to obtain the alloy powder that includes, on its surface, the concentrated portion in which the concentrations of Ni and Co are increased.

As a method of powdering the alloy material, the atomization method is preferably used. The atomization method is a method in which an alloy molten metal obtained by melting the alloy material is scattered in a spray, and in which thus the alloy molten metal is rapidly cooled.

Although a temperature condition (alloy melting temperature) when the alloy molten metal is obtained by melting the alloy material is not particularly limited, the alloy melting temperature preferably falls within a range equal to or greater than 1320° C. and equal to or less than 1600° C. and more preferably falls within a range equal to or greater than 1400° C. and equal to or less than 1550° C. In particular, the alloy melting temperature is equal to or greater than 1320° C., and thus the alloy material is melted more reliably and the fluidity of the alloy molten metal is enhanced, with the result that the alloy molten metal can be sprayed so as to be easily rapidly cooled. On the other hand, when the alloy melting temperature exceeds 1600° C., thermal energy is consumed wastefully, and thus the wear of the refractories such as the melting pot and the furnace wall becomes significantly, with the result that the productivity may be lowered. Hence, the alloy melting temperature is preferably equal to or less than 1600° C. and more preferably equal to or less than 1550° C.

The alloy molten metal obtained by melting can be powdered with a gas atomization method in which the alloy molten metal is made to flow down from a melting pot or the like, a high-pressure gas is sprayed as a medium for the alloy molten metal flowing down, the alloy molten metal is scattered in a spray, and the alloy molten metal is rapidly cooled (solidified). The gas atomization method is used as the method of powdering the alloy material, and thus the constituent components of the alloy material are rapidly cooled with slight time differences, with the result that while a nickel atom and a cobalt atom included in the alloy material are being microscopically concentrated, macroscopic concentration in which nickel and cobalt are gathered in the center of particles is unlikely to occur. Hence, it is possible to obtain the alloy powder which includes, on its surface, the concentrated portion in which the concentrations of nickel and cobalt are increased. The constituent components included in the alloy molten metal are rapidly cooled without crystal growth, and thus it is possible to obtain the alloy powder which includes a large number of crystallites having a small diameter. By this method, the particle diameter of the alloy powder can be further decreased.

The medium which is sprayed on the alloy molten metal serves both as a cooling medium for cooling the alloy molten metal and as a dispersion medium for dispersing the alloy molten metal to the medium.

As the gas serving as the medium, an inert gas which is unlikely to react with the alloy molten metal can be used, and nitrogen, argon, and water vapor can be used inexpensively. The spraying pressure of the gas serving as the medium is set so high that the volumetric flow rate of the medium is greater than that of the alloy molten metal. Here, the volumetric flow rate of the medium is greater than that of the alloy molten metal, and thus the alloy molten metal can be scattered over a wide area. The volumetric flow rate of the medium is greater than that of the alloy molten metal, and thus the alloy molten metal can be rapidly cooled.

The absolute temperature of the medium when the alloy molten metal is sprayed is preferably less than half the absolute temperature of the melting point of the alloy molten metal, and is more preferably equal to or less than 373K. The low temperature described above is adopted, and thus it is possible to prevent crystal growth when the alloy molten metal is solidified. Here, as the medium, a medium which has the same temperature as the atmosphere may be used, and, for example, a medium is supplied from a gas cylinder at room temperature, and thus the medium can be used more inexpensively.

In the atomization method, the ratio between the alloy molten metal and the gas or liquid is changed, and thus the particle diameter of the alloy powder can be adjusted. However, when an alloy powder whose average particle diameter is less than 20 μm is obtained, it is necessary to decrease the amount of alloy molten metal supplied and to increase the amount of gas supplied, and thus the efficiency of production of the alloy powder is easily lowered.

<<4. Recovery of Valuable Metals from Alloy Powder>>

The treatment for recovering the valuable metals from the alloy powder according to the present embodiment can be performed by a known method, and is not particularly limited. In particular, acid leaching treatment is preferable in that a large amount of electrical energy is not needed (unlike electrorefining) and that copper, nickel, and cobalt can be individually recovered.

[Acid Leaching Treatment]

In the acid leaching treatment, the alloy powder and the acid solution are brought into contact with each other under the presence of a sulfating agent. This treatment is performed, and thus copper, nickel, and cobalt are leached from the alloy powder into the solution, and among them, copper can be precipitated as a copper sulfide, with the result that a solid including the copper sulfide and a leaching solution containing nickel and cobalt can be obtained. In particular, since the alloy powder according to the present embodiment includes, on its surface, the concentrated portion in which the concentrations of nickel and cobalt are increased, the leaching of copper, nickel, and cobalt included in the concentrated portion into the acid solution is facilitated, and the acid enters the air gaps after the leaching, with the result that the contact area of the alloy powder and the acid solution is increased. In this way, the alloy powder is easily dissolved in the acid solution, and thus the leaching of the valuable metals from the alloy powder can be made to proceed more efficiently. In the alloy powder according to the present embodiment, the phosphorus grade is low, and thus the contamination of the recovered valuable metals with phosphorus can be reduced.

Reactions which occur when solid sulfur (S) is used as the sulfating agent and sulfuric acid is used as the acid solution are shown in reaction formulae (1) to (3). As shown in formulae (1) to (3) below, the alloy is brought into contact with sulfur serving as the sulfating agent so as to react therewith, and thus the sulfide of the leached copper is generated so as to be precipitated. Nickel and cobalt are leached by sulfuric acid serving as the acid, and they are present as ions in the leaching solution, with the result that extremely high contents thereof can be present in the leaching solution.

$$Cu + S \rightarrow CuS \quad (1)$$

$$Ni + H_2SO_4 \rightarrow NiSO_4 + H_2 \quad (2)$$

$$Co + H_2SO_4 \rightarrow CoSO_4 + H_2 \quad (3)$$

Although as the sulfating agent, elemental sulfur can be used, sulfating agents of liquid and gas such as sodium hydrogen sulfide (hydrogenation sodium sulfide), sodium sulfide and hydrogen sulfide gas may be used.

As the acid solution, sulfuric acid or nitric acid can be preferably used. Here, in particular, when sulfuric acid is used as the acid solution, a chloride or the like may be added in order to facilitate the leaching of nickel and cobalt from the alloy powder. An oxidant such as oxygen or hydrogen peroxide may be added to the acid solution, and in this case too, the leaching of nickel and cobalt from the alloy powder is facilitated.

The amount of acid solution brought into contact with the alloy is determined such that for example, an acid content in the total amount of nickel and cobalt included in the alloy is equal to or greater than 1 equivalent determined with formulae (2) and (3) described above, preferably equal to or greater than 1 equivalent and equal to or less than 24 equivalents and more preferably equal to or greater than 1 equivalent and equal to or less than 11 equivalents. Here, the concentration of the acid in the acid solution is increased, and thus the rates at which nickel and copper are leached can be increased.

The amount of sulfating agent brought into contact with the alloy is preferably equal to or greater than 1 equivalent determined with formula (1) described above with respect to the amount of copper included in the alloy.

A temperature when the acid solution and the sulfating agent are brought into contact with the alloy powder is, for example, equal to or greater than 50° C., preferably equal to or greater than 75° C., and more preferably equal to or greater than 95° C., and this temperature is preferably maintained until the leaching of the valuable metals into the acid solution is completed. In particular, in a case where the temperature when the acid solution and the alloy powder are brought into contact with each other is equal to or greater than 95° C., for example, as compared with a reaction at less than 75° C., the reaction rate can be remarkably increased. The reaction time when the acid solution and the alloy powder are brought into contact with each other can be, for example, 1 to 6 hours.

Preferably, when the acid solution and the sulfating agent are brought into contact with the alloy, the alloy is added to a mixture of the acid solution and the sulfating agent such that they are bought into contact with each other or the sulfating agent is first brought into contact with the alloy and then the acid solution is brought into contact therewith. On the other hand, when in a state where the sulfating agent is not present, the acid solution is brought into contact with the alloy, the leaching of the valuable metals into the acid solution is more likely to be insufficient.

[Valuable Metals after being Recovered]

The copper sulfide recovered in the present embodiment can be used as a raw material in an existing copper-smelting process without being processed; for example, an anode obtained from the copper sulfide is electrorefined and thus it is possible to obtain high-purity copper.

On the other hand, nickel and cobalt leached into the leaching solution are supplied to an existing nickel smelting process, a means such as solvent extraction is used to separate nickel and cobalt, and electrowinning is performed so as to obtain a nickel metal and a cobalt metal, or they are refined as a nickel salt and a cobalt salt, so as to be able to be recycled again as raw materials for the lithium ion battery.

As described above, the alloy powder according to the present embodiment is characterized in that the alloy powder includes, on its surface, the concentrated portion in which the concentrations of nickel and cobalt are increased, and that the phosphorus grade is less than 0.1% by mass. The alloy powder described above is particularly formed by rapid-cooling solidification so as to be able to be easily dissolved in the acid solution, and thus copper, nickel, and cobalt, which are valuable metals; can be efficiently recovered from the alloy powder.

EXAMPLES

Although the present invention will be described in further detail below using Examples and Comparative Example, the present invention is not limited to the Examples below at all.

Example 1

As an alloy material, a copper-nickel-cobalt alloy was used which was formed of 73.4% by mass of Cu, 12.1% by mass of Ni, 12.6% by mass of Co, 1.6% by mass of Fe and 0.1% by mass of Mn, and in which each of a sulfur grade and a phosphorus grade was less than 0.1% by mass, the gas atomization method was used to powder the alloy material, and a concentrated portion in which the concentrations of Ni and Co were high was formed. The copper-nickel-cobalt alloy was obtained by the following method: an electrolytic solution was removed from a waste lithium ion battery, the waste lithium ion battery was crushed, air was brought into contact with the obtained crushed material with a surface area sufficient for oxidizing the crushed material so as to perform oxidation roasting (pre-heating) at 700° C., then a graphite powder serving as a reducing agent was mixed and slag was separated from a molten material obtained by melting at 1500° C.

The copper-nickel-cobalt alloy was heated to an alloy melting temperature of 1500° C., argon gas at atmospheric temperature was sprayed on an alloy molten metal (which was the obtained molten alloy), and thus powdering using the gas atomization method was performed, with the result that an alloy powder was obtained.

When on the alloy powder described above, an energy dispersive X-ray spectrometer (made by JEOL Ltd., model number JSM-7100F) was used to measure the average concentrations of Ni and Co in the entirety of one particle of the alloy powder, the average concentration of Ni was 12% and the average concentration of Co was 13%. When the energy dispersive X-ray spectrometer was used to check the distribution of the concentrations of Ni and Co on the surface of the alloy powder, it was found that the concentrated portion (in which the concentrations of Ni and Co were higher than the average concentrations in the entire particle) was distributed on the surface of the alloy powder.

When on the alloy powder described above, a scanning electron microscope (made by JEOL Ltd., JSM-5510) was used to measure the diameters of crystallites, the diameters of the crystallites were so close as to be equal to or less than 15 μm, and the average diameter of the crystallites was 1.4 μm with reference to the cross-sectional area.

When on the alloy powder described above, a particle diameter distribution measuring device (made by HORIBA, Ltd., LA-950) was used to measure the particle diameter of the alloy powder by the laser diffraction/scattering method, the particle diameter distribution of the alloy powder was 4 to 344 μm, and the average particle diameter (volume average diameter) of the alloy powder was 74 μm.

25 g of the obtained alloy powder was collected, and with respect to a copper grade in the alloy powder, 9.3 g of elemental sulfur (solid sulfur) which was 1 equivalent for forming a copper sulfide shown in formula (1) described above was prepared as a sulfating agent.

In each of the Examples, with respect to the total amount of nickel and cobalt contained in the alloy powder, 10.4 cm$^3$ of 10 mol/l of sulfuric acid, which was 1 equivalent in the calculation of formulae (2) and (3) described above, was prepared as an acid solution.

The acid solution was heated to 95° C., the alloy powder and the sulfating agent were each added at the same time, they were stirred for a stirring time of 6 hours and thus acid treatment was performed, thereafter which solid-liquid separation was performed by filtration and the filtrate was analyzed with an ICP analyzer (made by Agilent Technologies Japan, Ltd., Agilent5100SUDV), with the result that the concentrations of the components of copper, nickel, and cobalt were determined.

Consequently, the leaching rate of each of the nickel and cobalt included in the alloy powder into the filtrate (leaching solution) was 99%, and the total amount included in the alloy powder was included in the leaching solution. On the other hand, the leaching rate of copper was reduced to 0.1%, and almost the total amount was precipitated as a copper sulfide.

Example 2

Classification was performed on the alloy powder obtained in Example 1 such that the maximum particle diameter was equal to or less than 45 μm.

When on the alloy powder after the classification, the energy dispersive X-ray spectrometer (made by JEOL Ltd., model number JSM-7100F) was used to measure the average concentrations of Ni and Co in the entirety of one particle of the alloy powder, the average concentration of Ni was 12% and the average concentration of Co was 13%. When the energy dispersive X-ray spectrometer was used to check the distribution of the concentrations of Ni and Co on the surface of the alloy powder, it was found that the concentrated portion (in which the concentrations of Ni and Co were higher than the average concentrations in the entire particle) was distributed on the surface of the alloy powder.

When on the alloy powder after the classification, the particle diameter distribution measuring device (made by HORIBA, Ltd., LA-950) was used to measure the particle diameter by the laser diffraction/scattering method, the average particle diameter (volume average diameter) was 27 μm.

The acid treatment was performed on the obtained alloy powder by the same method as in Example 1 except that the stirring time was changed to 4 hours, and after solid-liquid separation by filtration, the filtrate (leaching solution) was analyzed with the ICP analyzer (made by Agilent Technologies Japan, Ltd., Agilent5100SUDV), with the result that the concentrations of the components of copper, nickel, and cobalt were determined.

Consequently, the leaching rate of each of nickel and cobalt included in the alloy powder into the filtrate (leaching solution) was 99%, and the total amount included in the alloy powder was included in the leaching solution. On the other hand, the leaching rate of copper was reduced to 0.1%, and almost the total amount was precipitated as a copper sulfide.

Hence, it is found that with the alloy powder provided where the concentrated portion (in which the concentrations of Ni and Co are higher than the average concentrations in the entire particle) is distributed on the surface and where the phosphorus grade is less than 0.1% by mass, even when cobalt is included in the alloy powder, large amounts of copper, nickel, and cobalt, which are valuable metals; can be rapidly recovered by the acid treatment.

Comparative Example 1

The same alloy material as in Example 1 was solidified as a button ingot without being powdered by the gas atomization method, and the acid treatment was performed thereon.

When on the button ingot before the acid treatment, the energy dispersive X-ray spectrometer (made by JEOL Ltd., model number JSM-7100F) was used to measure the average concentrations of Ni and Co in the entirety of one particle of the alloy powder, the average concentration of Ni was 12% and the average concentration of Co was 13%. The concentration distribution of Ni and Co on the surface of the button ingot was substantially uniform, and a portion which served as the concentrated portion was not present on the surface.

When on the button ingot before the acid treatment, the scanning electron microscope (made by JEOL Ltd., JSM-5510) was used to measure the diameters of crystallites, grain boundaries were not recognized, and the average diameter of the crystallites was equal to or greater than 100 μm.

When on the button ingot before the acid treatment, the particle diameter was measured with calipers, the thickness was 5 mm, and the diameter was 27 mm.

The acid treatment was performed on the alloy powder by the same method as in Example 1, and after solid-liquid separation by filtration, the filtrate (leaching solution) was analyzed with the ICP analyzer (made by Agilent Technologies Japan, Ltd., Agilent5100SUDV), with the result that the concentrations of the components of copper, nickel, and cobalt were determined.

Consequently, each of the leaching rate of the nickel included in the alloy powder into the filtrate (leaching solution), the leaching rate of the cobalt into the filtrate (leaching solution) and the leaching rate of the copper into the filtrate (leaching solution) was less than 0.1%, and the leaching of copper, nickel, and cobalt into the solution was hardly made to proceed.

The invention claimed is:
1. A method for producing an alloy powder, the method comprising:

a melting step of melting a waste lithium ion battery so as to obtain a molten material;

a slag separation step of separating slag including phosphorus from the molten material so as to recover an alloy material which contains Cu and at least one of Ni and Co; and a powdering step of powdering, with a gas atomization method, a molten alloy which is formed of the alloy material and in which a phosphorus grade is less than 0.1% by mass, to obtain the alloy powder having, on its surface, a concentrated portion in which at least one of Ni and Co is increased, wherein in the powdering step, the molten alloy is powdered with the gas atomization method to obtain the alloy powder which has an average particle size of 20 μm or more and 300 μm or less and which includes, on its surface, a concentrated portion in which the concentrations of nickel and cobalt are increased, and wherein the molten alloy is formed of the alloy material, the molten alloy has a phosphorus grade of less than 0.1% by mass, and the molten alloy is a copper-nickel-cobalt alloy at a temperature of 1320° C. or more and 1600° C. or less having a Cu content of 50% by mass or more and 97% by mass or less, a Ni content of 3% by mass or more and 30% by mass or less, a Co content of 3% by mass or more and 30% by mass or less, and a total content of Ni and Co of 3% by mass or more and 50% by mass or less.

2. The method for producing an alloy powder according to claim 1, further comprising: a pre-heating step of roasting, before the melting step, the waste lithium ion battery at such a temperature that the waste lithium ion battery is not melted.

* * * * *